United States Patent [19]
Cathrein et al.

[11] Patent Number: 5,884,660
[45] Date of Patent: Mar. 23, 1999

[54] MEANS FOR TRANSFERRING A FLOWABLE MATERIAL

[75] Inventors: Ernst Cathrein, Aesch, Switzerland; Erwin Grab, Rümmingen, Germany

[73] Assignee: Glatt Maschinen-und Apparatebau AG, Prattein, Switzerland

[21] Appl. No.: 663,014

[22] Filed: Jun. 7, 1996

[30] Foreign Application Priority Data

Jun. 7, 1995 [CH] Switzerland ............... 1666/95

[51] Int. Cl.⁶ ..................................... F16L 29/00
[52] U.S. Cl. ........................... 137/614.01; 285/97
[58] Field of Search ................. 137/614.01, 614, 137/614.02; 285/96, 97

[56] References Cited

U.S. PATENT DOCUMENTS

| | | |
|---|---|---|
| 3,106,223 | 10/1963 | Cooper ................. 137/614.01 |
| 5,095,946 | 3/1992 | McLennan . |
| 5,150,735 | 9/1992 | Bandy et al. . |
| 5,284,182 | 2/1994 | McLennan . |
| 5,295,507 | 3/1994 | Bandy et al. . |

FOREIGN PATENT DOCUMENTS

| | | |
|---|---|---|
| 0 447 023 | 9/1991 | European Pat. Off. . |
| 43 42 962 | 12/1993 | Germany . |
| 44 15 488 | 11/1995 | Germany . |
| 888541 | 1/1962 | United Kingdom ............... 137/614.01 |

*Primary Examiner*—Kevin Lee
*Attorney, Agent, or Firm*—Jacobson, Price, Holman & Stern, PLLC

[57] ABSTRACT

A valve apparatus comprises two housings which can be alternatively connected to one another and separated from one another and possesses an orifice. Each housing holds a flap which is pivotable about an axis of rotation and has a disc and a pivot. The flap can be swivelled into a closed position in which it closes the orifice of the relevant housing at the flat mouth surface of the orifice. Each axis of rotation passes through the mouth area of the relevant housing at an acute angle. Each pivot is pivotably mounted in a hole of the relevant housing, which hole completely surrounds said pivot in cross-section, and is sealed from the housing. This gives a stable support and good sealing of the pivots and, in combination with the discs adjacent to one another when the housings are connected together, makes it possible to avoid contamination of the environment by the transferred material and contamination of the latter by materials present in the vicinity of the housing.

34 Claims, 8 Drawing Sheets

MEANS FOR TRANSFERRING A FLOWABLE MATERIAL

BACKGROUND OF THE INVENTION

1. Field of the invention

The invention relates to apparatus for transferring a flowable, in particular a particulate or possibly liquid or pasty material. This may contain, for example, at least one active ingredient and/or excipient for the formation of a drug.

In the preparation and/or further processing and/or transport of a flowable material, for example consisting of more or less solid particles, it is often necessary to connect a material-delivering apparatus containing the material temporarily to a material-accepting apparatus, i.e. to dock the two apparatuses with one another, to transfer the material from the material-delivering apparatus to the material-accepting apparatus and then to separate the two apparatuses again. For example, a material can be transported by means of a transportable container forming part of a material-delivering apparatus to a material-accepting apparatus which is intended, for example, for processing the material and, for example, is stationary, and can be filled into said material-accepting apparatus, and/or a material prepared and/or processed in a material-delivering apparatus can be transferred to a transportable container serving as a material-accepting apparatus, or a material can be transferred by means of a transportable container into another container. One and the same transportable container may serve as part of a material-accepting apparatus in a first material transfer and subsequently as part of a material-delivering apparatus in a second material transfer. Furthermore, the material-delivering and the material-accepting apparatuses may be formed by two essentially stationary apparatuses, one of which is provided with a movable or adjustable material line which is temporarily connected to the other apparatus for material transfer.

2. Description of the prior art

Known means for such material transfer have, for example, a transportable container which serves for delivery of the material and has a material outlet arranged at its lower end and a container which serves for accepting the material and has a material inlet at its upper end. The material outlet and the material inlet each have a housing whose wall has a vertical pipe connection with a cylindrical inner surface and, at the lower and upper end, respectively, an orifice having a horizontal orifice edge. Starting from disconnected positions in which they are separated from one another, the two containers and the housing can be brought into a connected position in which the two housings abut in abutting regions enclosing the orifices. Each of the two housings holds a closure flap which can be swivelled about a horizontal axis of rotation and has circular disc which can be swivelled alternatively into a closed position or open position for, respectively, closing and opening the passage bounded by the relevant housing. When such a means is used, the flaps in housings present in disconnected positions usually remain in the closed position and are temporarily swivelled into the open position only after connection of the two housings, in order to transfer material contained in one container to the other container.

In many known arrangements of this type, the flaps are arranged in the housings in such a way that the axes of rotation are a distance away from the horizontal orifice of the relevant housing. If the flaps of such means are swivelled back into the closed position after transfer of the material and the two housings are separated from one another, material which adheres to those sections of the inner surfaces of the housing which are located between the orifices and the flaps and to those end surfaces of the flaps which face the orifices can enter the environment. Such contamination of the environment of the means may have serious consequences in the case of materials containing pharmaceutically active and/or toxic substances. Conversely, when the housings are separated from one another, humid air, dust and other contaminating materials from the environment may enter the housing through the orifices in the housing as far as the flaps and may enter the transferred material during a subsequent transfer process and contaminate this material or otherwise damage it.

A coupling and closure means disclosed in German Patent 43 42 962 and intended for transferring a material has two housings with pipe connections and two flaps which have a disc and pivots, projecting away from this and semicircular in cross-section, and which can be swivelled about axes of rotation which lie in the horizontal planes which are defined by the end surfaces of the pipe connections and are at right angles to the axes of the pipe connections. If the two housings with their end surfaces abut one another, the discs of the two flaps are adjacent to one another, the axes of rotation of the two flaps coinciding. The flat end surfaces of the pipe connections are provided with recesses in which are arranged bearing shells which have a semicircular cross-section and into which the pivots of the flaps fit in the closed position.

If the flaps were mounted exclusively in the semicircular bearing shells, the flaps could fall out of the bearing shells when the housings were separated from one another. Additional bearing means not disclosed in German Patent 43 42 962 must therefore be present.

The means disclosed in said German patent also has various disadvantages. One of these disadvantages is that the semicircular recesses and grooves of the two pipe connections, the bearing shells and the flaps must be produced very exactly and in particular must be very exactly aligned during connection of the two pipe connections, to enable the flaps to be swivelled when the housings are connected to one another. This increases the costs for the production of the means and the time required for connecting or coupling the housings. A further disadvantage is that it is difficult and expensive to seal the cavities of the two pipe connections tightly from the environment because of the semicircular recesses and pivots. The seals which are fastened to the pipe connections, seal the flaps in the closed position and prevent swivelling at least when the pipe connections are separated from one another are subjected to severe wear during swivelling of the flaps. In addition, in the case of a means which can be used in practice and possibly sealed at the recesses and pivots by sealing means present in addition to the stated seals, it is probably difficult and time-consuming to separate the flaps from the pipe connections for thorough cleaning of the flaps, of the pipe connections and of the containers connected to these, and thereafter to connect them to said pipe connections again. According to said patent, two pneumatic apparatuses are also present, by means of which the upper pipe connection and parts connected thereto can be lowered and raised during coupling and separation of the two pipe connections. These pneumatic apparatuses increase the production costs and the space required by the means and in addition consume compressed air and hence energy.

SUMMARY OF THE INVENTION

It is therefore the object of the invention to provide apparatus for transferring a flowable material, with which apparatus the disadvantages of the known arrangements can be avoided. It is intended in particular to ensure that the flaps are thoroughly sealed against the housing at the pivots and can be pivotably mounted in a stable manner with simple constructional means even when the housings are separated from one another, and the housings should furthermore be capable of being connected to one another and separated from one another in a simple manner and the housings and flaps should be capable of being cleaned easily and quickly.

This object is achieved, according to the invention, by a means for transferring a flowable, in particular particulate material, having two housings, each of which has an orifice and holds a flap with a pivot so that it is pivotable about an axis of rotation, wherein the two housings alternatively can be separated from one another and can be brought into a connected position in which they abut one another in abutting regions surrounding the orifices, wherein each flap can be swivelled alternatively into a closed position in which the flap closes the orifice of the relevant housing and into an open position into which the flap at least partly opens the orifice, wherein the flaps are adjacent to one another when the housings are in the connected position and wherein the two axes of rotation coincide when the housings are in the connected position, wherein each flap is mounted rotatably by means of a pivot in one of the housings, and wherein each axis of rotation passes at a pivot into the relevant housing and emerges from the relevant housing through the orifice of the latter.

According to the invention, each flap may be mounted by means of a single pivot located on one side of it, in only one of the two housings.

BRIEF DESCRIPTION OF THE DRAWINGS

The subject of the invention is illustrated in more detail below with reference to an embodiment shown in the drawings and variants of said embodiment. In the drawings.

DESCRIPTION OF THE PREFERRED EMBODIMENTS

The connecting and closure means shown in various states in FIGS. 1 to 6 serves for transferring flowable material, for example consisting of more or less solid particles, and has two housings which alternatively can be detachably connected to one another—i.e. can be docked with one another—and can be separated from one another, namely a first, upper housing 1 and a second, lower housing 2. The first housing 1 holds a first closure flap 3. The second housing holds a second closure flap 4. The first housing 1 defines a first main axis 5 and a first axis 7 of rotation which is at right angles to said main axis and about which the first closure flap 3 can be swivelled. The second housing 2 defines a second main axis 6 and a second axis 8 of rotation which is at right angles to said main axis and about which the second closure flap 4 can be swivelled. The two main axes 5, 6 are vertical and the two axes 7, 8 of rotation are accordingly horizontal when the means is used.

The first housing 1 has, as a main component, a one-piece, first hollow body 11, which forms at least the largest part of the wall of the housing 1 and is also shown partly in FIGS. 7, 8, 12 and 13. The hollow body 11 is sleeve-like and/or annular, encloses the first main axis 5 and has an essentially cylindrical outer or lateral surface 11a, which is coaxial with said main axis, and an end surface 11b on its lower side. The innermost section of the end surface 11b consists of a flat annular surface 11c which is inclined relative to a horizontal plane at right angles to the first main axis 5. The annular surface 11c is provided with an annular groove 11d which contains a seal 13 consisting of an O-ring. The annular surface 11c, together with the seal 13, forms the abutting region 14 of the first housing. The outer section of the end surface of the first housing 1 consists of a flat annular surface at right angles to the main axis 5. The hollow body 11 is bounded at the top by an end surface 11f which for the most part consists of a flat annular surface which is at right angles to the first main axis 5 and is accordingly horizontal. The hollow body 11 has an inner surface 11g whose lowermost, annular inner surface section 11*h* forms a part of a spherical surface. A cylindrical inner surface section coaxial with the main axis 5 is adjacent to the upper end of the inner surface section 11*h*. The inner surface 11*g* of the first housing 1 encloses a first cavity 15. The wall of the hollow body 11 is provided, in its end surface 11*b*, with a first orifice 16. This has a first orifice edge 16*a* which is formed by the edge at which the annular surface 11*c* and the inner surface section 11*h* abut one another. The first orifice edge 16*a* encloses and defines a first, flat mouth area of the first orifice 16. This mouth area lies in the same plane as the annular surface 11*c* of the hollow body 11. The annular surface 11*c* and the first axis 7 of rotation are arranged relative to one another in such a way that the axis 7 of rotation is at right angles to the intersecting line in which a horizontal plane passing through the first axis 7 of rotation intersects the first flat connecting surface defined by the annular surface 11*c* and the edge of the first orifice 16. The first axis 7 of rotation passes through the wall of the hollow body 11 into the first cavity 15 and through the first orifice 16 again out of the first cavity 15. The first main axis 5 and the first axis 7 of rotation intersect one another and the flat mouth area of the first orifice 16 and the connecting surface at the centre of the stated spherical surface. The first axis 7 of rotation makes an acute angle with the flat mouth area of the first orifice 16 and the connecting surface. Said angle is preferably at least 5°, preferably at most 45° and, for example, 10° to 30°. The hollow body 11 likewise has an orifice in the end surface 11*c*. The cavity 15 thus forms a passage which passes through the hollow body 11 and extends from the orifice 16 to the orifice present in the end surface 11*f*.

Figure 7:
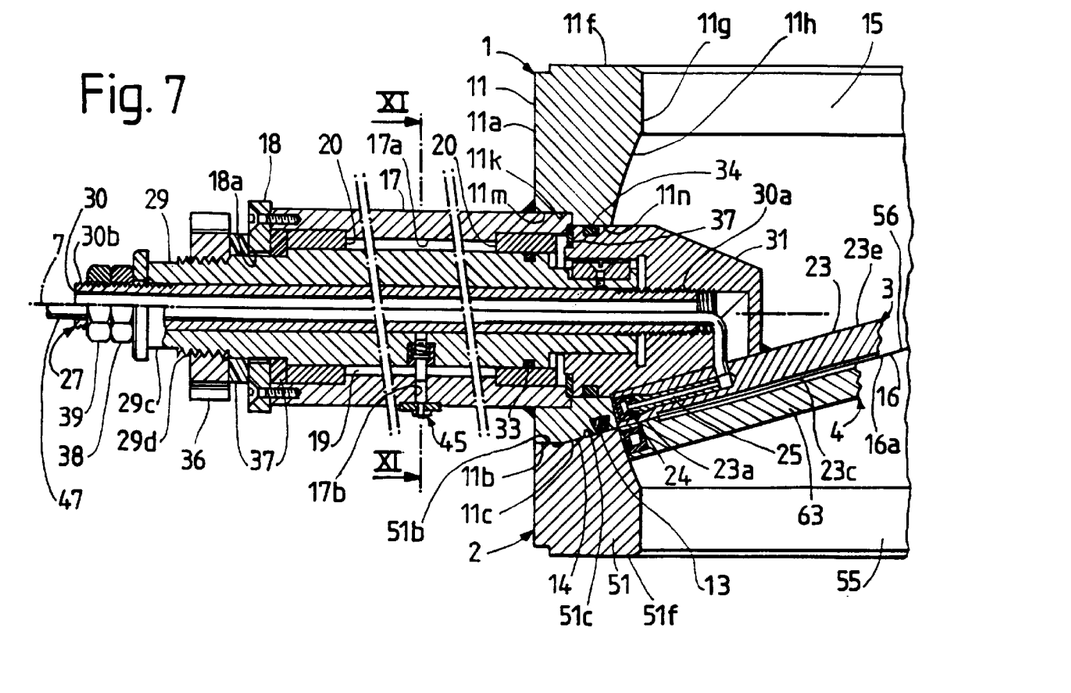
FIG. 7 shows a vertical section through parts of the two housings connected to one another and the flaps held by said housings and the pivot mounted in the upper housing, on a larger scale than FIGS. 1 to 6.

The first hollow body 11 is provided with a hole 11*k* which is coaxial with the first axis 7 of rotation, passes through the wall of the hollow body, is shown particularly clearly in FIG. 7, consists of a stepped bore and has an outer cylindrical hole section 11*m* and an inner, narrower hole section 11*n* opening into the cavity 15. The first housing 11 furthermore has a first sleeve 17 shown particularly clearly in FIG. 7. Said sleeve has a cylindrical outer surface and projects into the outer hole section 11*m*. The hollow body 11 and the sleeve 17 consist of metallic materials—for example of stainless steel—and are connected rigidly and tightly to one another, namely welded. The sleeve 17 has an axial through-hole 17*a* which has cylindrical sections of different diameters. The sleeve 17 furthermore has a radial hole 17*b* which opens into the axial hole 17*a*. An annular end element 18 is detachably fixed by means of screws at the outer end of the sleeve 17, said end element consisting of a small annular plate or flange and having a hole 18*a* coaxial with the first axis 7 of rotation. The inner hole section 1in of the hollow body 11 and the holes 17*a*, 18*a* of the sleeve 17 or of the end element 18 together form a hole 19 in the wall of the first housing 1, which hole is coaxial with the first axis 7 of rotation and essentially rotationally symmetrical. The sleeve 17 contains at least one radial bearing 20 friction-set in its axial hole 17*a*, namely two such bearings. These bearings are formed by annular sliding bearings which are coaxial with the axis of rotation, completely surround said axis and consist of a metallic bearing material, for example bronze.

The first closure flap 3 has a disc 23 which serves as closure member for closing the first orifice 16 and is circular in plan view and a first pivot 27 which is rigidly and in particular nonrotatably connected to said disc and consists of a plurality of parts. Said pivot is in general rotationally symmetrical with respect to the first axis 7 of rotation, passes through the hole 19 in the first housing 1 and is completely enclosed in cross-section by the hole 19—or more precisely—by those surfaces of the wall of the first housing 1 which bound said hole. The disc 23 has an end surface 23*a* which is present at the bottom in FIGS. 1, 7, 8, 12 and 13. Said end surface has, at its edge, an annular, flat contact surface 23*b*, which is narrow compared with the diameter of the disc, and an indentation 23*c* which is surrounded by said contact surface and occupies the remaining part of the end surface 23*a*. The contact and end surface edge 23*d* bounding the flat contact surface 23*b* and hence the entire end surface 23*a* on the outside defines a plane in which the contact surface 23*b* also lies. The back surface 23*e* of the disc 23 faces away from the end surface 23*a* and is flat and parallel to the last-mentioned plane. The disc 23 has, on the outside, an edge 23*f* which is provided with an annular groove 23*g* which is open toward the peripheral or edge surface of the disc. The width of the annular groove is at least 50% and, for example, at least or about 70% of the total width of the edge 23*f*, so that all that remains of the actual disc at the edge is a narrow rib on each of the two sides of the annular groove 23*g*. The peripheral surfaces of the two ribs consist, for example, of narrow cylindrical annular surfaces whose edges are rounded or bevelled in a section passing through the axis of the disc. However, it would also be possible to form the peripheral surfaces of the ribs by sections of a spherical surface whose centre coincides at least approximately or exactly with the centre of the spherical surface defined by the inner surface section 11*h* of the hollow body 11. The disc 23 is provided with an angled passage 23*h* which penetrates the disc 23 in the back surface 23*d* of the disc 23 in the vicinity of the edge 23*f* and opens into the annular groove 23*g*. The annular groove 23*g* contains an annular, hollow seal 24 which consists of a tube which is approximately square in cross-section and has ribs running along the circumference of the disc 23, on the outside of said tube present in the orifice of the annular groove 23*g*. The hollow seal 24 is provided with a nipple 25 which projects into the passage 23*h* and has a through-hole connecting the cavity of the seal 24 to the passage 23*h*.

Figures 8, 9, 10:
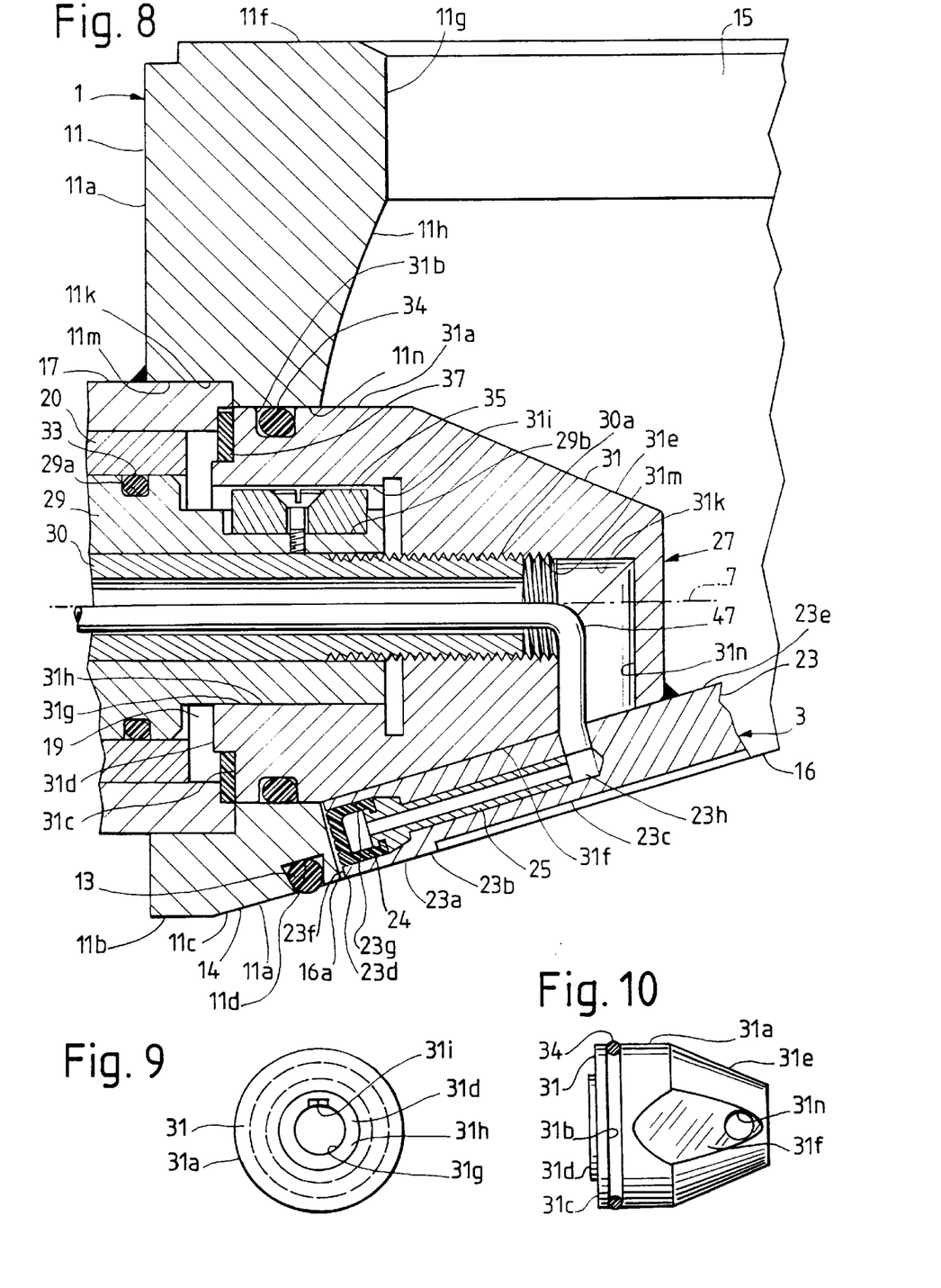
FIG. 8 shows a vertical section through a part of the upper housing and the flap held by this, on an even larger scale than FIG. 7.
FIG. 9 shows a view of the disc holder of the pivot mounted in the upper housing, viewed from the left side of FIG. 7.
FIG. 10 shows a view of that side of the disc holder of the pivot mounted in the upper housing which is located at the bottom of FIG. 7.
Figure 11:
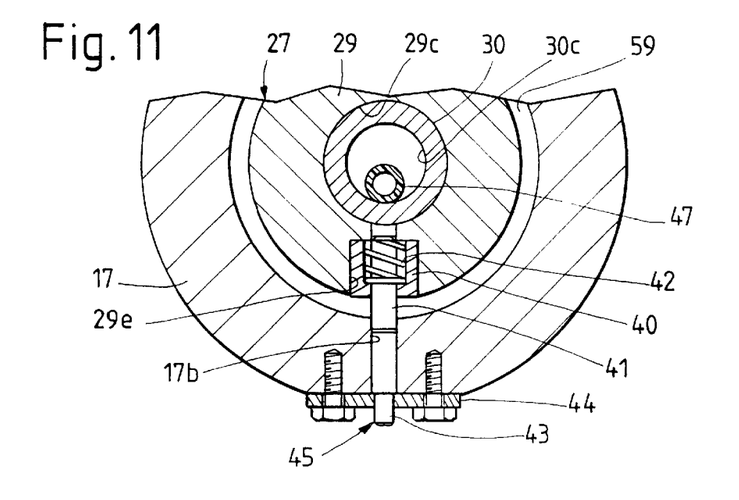
FIG. 11 shows a section through parts of the upper housing and of the pivot mounted therein, along the line XI—XI of FIG. 7, on a larger scale than this.
Figure 12:
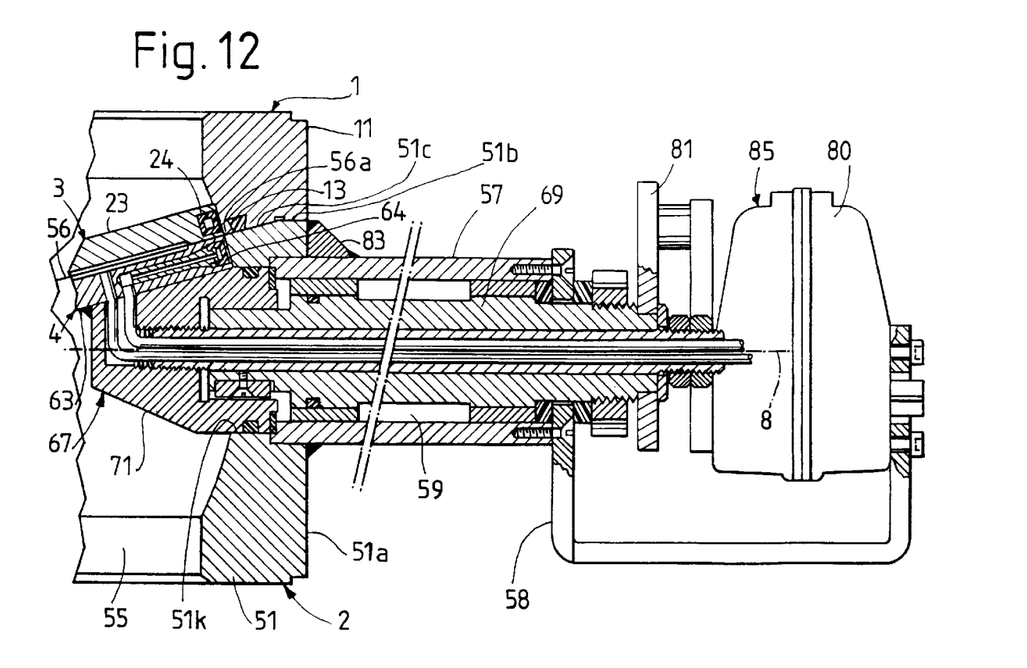
FIG. 12 shows a vertical section through parts of housings connected to one another and of the flaps and of the pivot mounted in the lower housing, on a larger scale than FIGS. 1 to 6.
Figure 13:
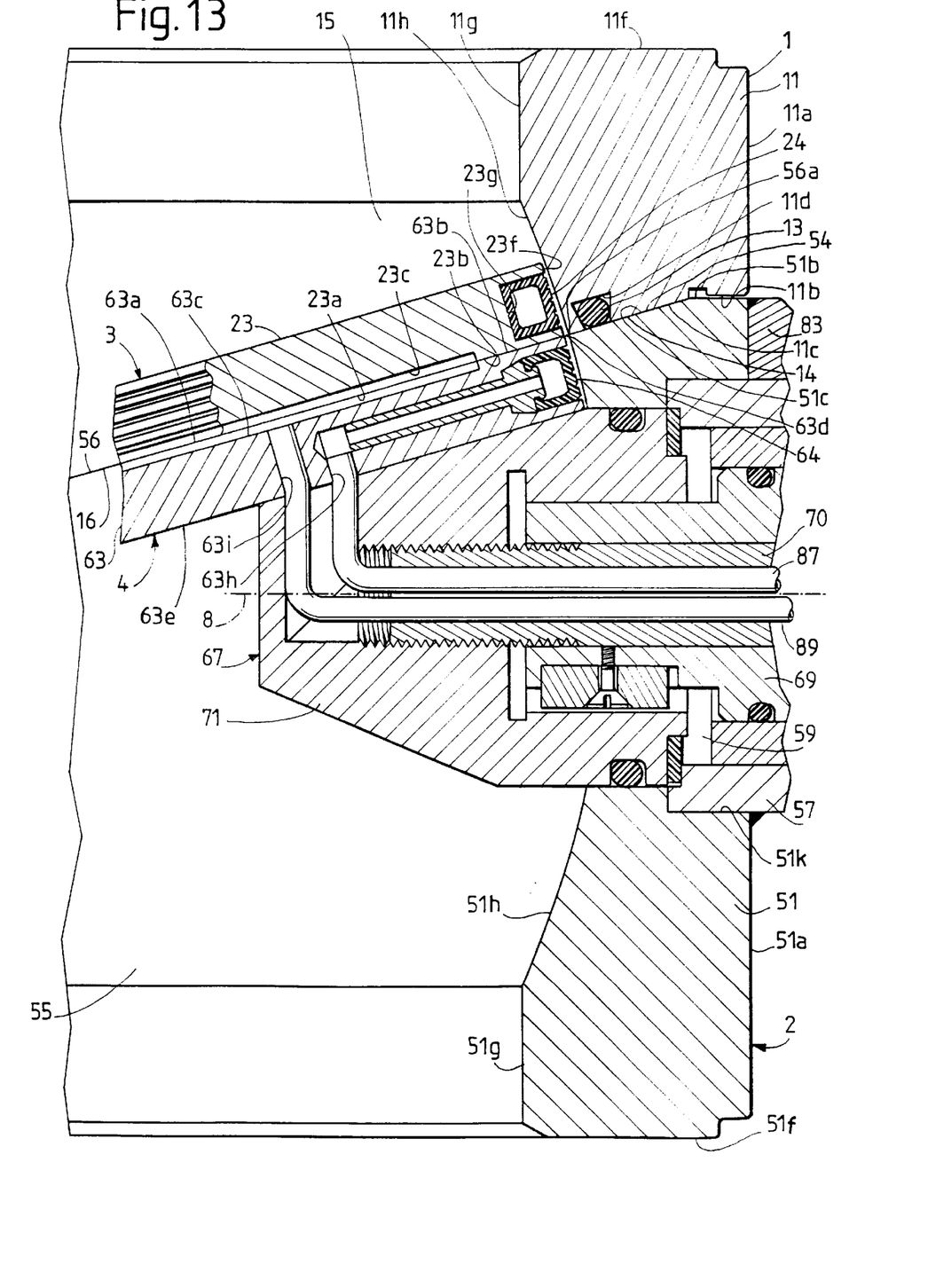
FIG. 13 shows a part of FIG. 12 on an even larger scale.

The first pivot 27 has, as main components, a hollow rod or hollow shaft 29, a hollow bolt 30 and a disc holder 31, which is shown separately in FIGS. 9 and 10. The hollow rod or shaft 29 passes through the first sleeve 17, the radial bearing 20 fixed therein and the end element 18 and is mounted in the first housing 1, rotatably about the axis 7 of rotation, by means of the radial bearings 20 which completely enclose them. The outer surface of the rod or shaft 29 is provided with an annular groove 29*a* and is sealed by means of a seal 33 arranged in said annular groove, consisting of an O-ring and completely enclosing the rod or shaft 29, against the inner surface of the radial bearing 20 present closer to the cavity 15. The rod or shaft 29 is provided with a short longitudinal groove 29*b* in the vicinity of its end located closer to the cavity 15. At its end projecting from the end element 18, the hollow rod or shaft 29 has a polygonal, for example tetragonal section 29*c* and, between this and the element 18, an outer thread 29*d* and a cylindrical section. The hollow rod or shaft 29 has an axial, essentially cylindrical through-hole, and between the two radial bearings 20, a radial, stepped hole 29*e* shown particularly clearly in FIG. 11.

The hollow bolt 30 is essentially cylindrical, passes through the axial hole in the hollow rod or shaft 29 with at most a small amount of radial play and has an axial through-hole, and an outer thread 30*a* or 30*b* at both ends projecting from the rod or shaft 29. The thickest section 31*a* of the disc holder 31 is essentially cylindrical and has a diameter which is greater than the largest diameter of the hollow rod or shaft 29, so that the disc holder 31 projects beyond the rod or shaft 29 radially with respect to the first axis 7 of rotation and forms a head of the pivot 27. The cylindrical section 31a is present, partly with a small amount of radial play, in the inner hole section 11n of the hollow body 11 and is provided with an annular groove 31b. An annular seal 34 which seals the disc holder 31 against the hollow body 11 is arranged in said annular groove. On that side of the cylindrical section 31a which faces away from the cavity 15, the disc holder 31 has a radial flat surface 31c and, within this, a collar 31d projecting away in the axial direction from the cylindrical section 31a. The disc holder 31 furthermore has an essentially conical section 31e which projects away from the cylindrical section 31a toward the main axis 5 and into the cavity 15 and tapers in a direction away from the section 31a. On that side facing the disc 23, the disc holder 31 has a flat surface 31f which is inclined relative to the first axis 7 of rotation and extends approximately from the thinner end of the conical section 31e to the cylindrical section 31a. The disc 23 rests with its back surface 23e against the flat surface 31f and is rigidly fixed, namely welded, to the metallic disc holder 31 consisting of stainless steel. The disc holder 31 is provided with a hole 31g which is coaxial with the axis 7 of rotation and consists of a stepped blind hole and penetrates into the disc holder at that end of the disc holder which faces away from the first cavity 15. The hole 31g has, at its mouth, a cylindrical hole section 31h whose diameter is slightly smaller than the internal diameter of the radial bearing 20 and into which an end section of the hollow rod or shaft 29 projects, at least approximately without play. The hole section 31h is provided with a longitudinal groove 31i and nonrotatably connected to the rod or shaft 29 by a feather key 35 which engages said longitudinal groove 31i and the longitudinal groove 29b of the rod or shaft 29 and is fixed to the latter with a screw. Furthermore, the hole 31g has a relatively narrow hole section 31k with an inner thread 31m. The bolt 30 projects into the hole 31g and the outer thread 30a of said bolt is screwed to the inner thread 31m. The disc holder 31 has a radial hole 31n which penetrates the disc holder in the flat surface 31e and opens into the inner end section of the axial hole 31g.

Also present are at least two and, for example, three annular axial bearings 37 which serve for axial mounting of the pivot 27 and consist, for example, of plastic and one of which is arranged between the end element 18 and a groove-containing, self-locking nut 36 screwed onto the outer thread 29d of the hollow rod or shaft, one of which is arranged on the other side of the end element 18, between this and a radial surface of the rod or shaft 29 in the sleeve 17, said surface facing said end element, and one of which is arranged between the radial surface 31c of the disc holder 31 and a radial surface of the sleeve 17, which surface faces this surface 31c. This last axial bearing is present partly in an extension of the axial hole 17a of the sleeve 17 and is penetrated by the collar 31d of the disc holder 31. When the self-locking nut 36 assumes its intended position as shown, the hollow rod or shaft 29 is supported, nondisplaceably along the first axis 7 of rotation or with a small amount of play, on the first housing 1 by the two axial bearings 37 adjacent to the end element 18. Two nuts 38 are screwed onto the outer thread 30b of the bolt 30. These nuts press a washer against that end of the hollow rod or shaft 29 which faces away from the cavity 15 and projects from the sleeve 17. The nuts 38 thus exert on the bolt 30 a force which is directed away from the cavity 15 and which in turn holds the disc holder 31 toward the axial bearing 37 arranged between said disc holder and a radial surface of the sleeve 17. As can be seen in FIG. 7 and particularly clearly in FIG. 8, the hollow rod or shaft 29 and the disc holder 31 are dimensioned and formed, for example, in such a way that that end section of the hollow rod or shaft 29 which projects into the hole section 31h of the disc holder 31 would in principle still be axially displaceable in the hole section 31h if the first flap 3 were installed in the first housing 1 and if only the rod or shaft 29 and the disc holder 31 are considered alone without the remaining parts. The axial position of the disc holder 31 relative to the first housing 1 and the hollow rod or shaft is then determined by the axial bearing 35 adjacent to the radial surface 31c of the disc holder 31. The axial force acting on this axial bearing 31, i.e. the force parallel to the first axis 7 of rotation, can be adjusted with the aid of the two nuts 38 during installation of the first closure flap 4 in the first housing 1. However, it would also be possible to form the hollow rod or shaft 29 and the disc holder 31 in such a way that, in the assembled state, their surfaces, for example radial and flat or conical ones, are adjacent to one another. For this purpose, the axial bearing 37 arranged between surfaces of the sleeve 17 and the disc holder 31 or possibly the axial bearing 37 adjacent to the right side of the end element 18 in FIG. 7 could then be omitted. The bolt 30, the nut 38 screwed thereon and the washer arranged between the latter and the end element 18 form, both in the embodiment of flap 3 shown and in the previously described variants, detachable fixing and nondisplacement means 39 which connect parts of the first flap 3—in particular the disc 23 and the disc holder 31—detachably and nonrotatably to the hollow rod or shaft 29 and hence pivotably and axially nondisplaceably or at most displaceably with little play to the first housing and in particular prevent said parts from undergoing displacements directed along the first axis 7 of rotation from the vicinity of the first housing 1 toward the first cavity 15.

A bush 40 is fixed in the radial hole 29e of the hollow rod or shaft 29. Said bush, together with a section of the hole 29e, guides a locking element 41 which consists of a pin having a collar. A spring 42 is arranged in the bush 40, said spring engaging the collar of the locking element 41 and pressing the latter outward. When the first flap 3 is in its closed position shown in FIGS. 1, 3, 7, 8, 12 and 13, the spring 42 presses the locking element 40 according to FIGS. 7 and 11 into the radial hole 17b of the sleeve 17. In the hole 17b of the sleeve 17, which hole is located at the lowermost peripheral point of the sleeve 17, a pressure pin 43 projecting outward from the hole 17b is displaceably guided and prevented from falling out of the hole 17b by a stop 44 detachably fixed with screws to the sleeve 17. The two holes 17b, 29e, together with the parts coordinated with them and the stop 44, form rotation-preventing means 45 for preventing the first flap from executing unintended rotations in its closed position.

A gas line 47 has a hose which passes through the axial hole of the bolt 30 and the axial hole 31g and the radial hole 31n of the disc holder 31. One end of the line 47 is tightly connected to the passage 23h of the disc 23 and by this passage 23h to the cavity of the seal 24. The other end of the line 47 is connected to a gas supply apparatus 48 indicated in FIG. 1.

The second, lower housing is substantially the same as the first, upper housing 1, but is arranged differently. The housing 2 has in particular a second, one-piece hollow body 51 which forms a substantial part of the wall of the second housing. The hollow body 51 has a lateral surface 51a and an upper end surface 51b with an annular surface 51c corresponding to the annular surface 11c, but no annular groove corresponding to the annular groove 11d is present in said annular surface 51c. The second hollow body 51 has an end surface 51f at the bottom. The inner surface 51g of the hollow body 51 has an inner surface section 51h which forms a part of a spherical surface. The second hollow body furthermore has a hole 51k which is coaxial with the second axis 8 of rotation and is otherwise formed analogously to the hole 11k. The annular surface 51c of the hollow body 51 forms the abutting region 54 of the second housing 2.

The second housing 2 encloses a second cavity 55 and a second orifice 56 which, in the end surface 51b, is connected to said cavity and has a second orifice edge 56a. The second axis 8 of rotation passes through the second orifice 56 in a manner analogous to that in which the first axis 7 of rotation passes through the first orifice 16. The second axis 8 of rotation accordingly makes an acute angle with the second, flat mouth area defined by the second orifice edge 56a and with the second, flat connecting surface which is formed by the second mouth area and the annular surface 51c.

The second housing 2 has a second sleeve 57. This is formed substantially identically to the first sleeve 17 and differs from the latter only in that it contains no hole corresponding to the radial hole 17b and that no stop corresponding to the stop 44 is fixed to the second sleeve 57. An end element 58 is detachably fixed to that end of the second sleeve 57 which faces away from the second hollow body 51. The hole 51k of the second hollow body 51, together with the axial hole of the second sleeve 57 and a hole of the end element 58, form a hole 59 of the wall of the second housing 2, which hole is coaxial with the second axis 8 of rotation.

The second closure flap 4 is likewise formed substantially similarly to the first flap 3 and has a circular, second disc 63. Analogously to the first disc 23, this has an end surface 63a, a contact surface 63b, an indentation 63c, a contact and end surface edge 63d, a back surface 63e and a passage 63h. The second disc is provided at the edge with a hollow seal 64 arranged analogously to the hollow seal 24. Furthermore, the second flap 4 has a second pivot 67 with a hollow rod or hollow shaft 69, a hollow bolt 70 and a disc holder 71. The second pivot 67 is formed, pivotably mounted and sealed substantially similarly to the first pivot 27 and differs from this essentially only in that its hollow rod or shaft 69 has no hole corresponding to the radial hole 29e and accordingly holds no locking element corresponding to the locking element 41.

The end element 58 detachably fixed with screws to the second sleeve 57 serves, analogously to the end element 18, together with bearings, for supporting the hollow rod or shaft 69 and additionally for holding the housing of a pivot drive apparatus 80. This has, for example, an electrically or pneumatically or hydraulically drivable motor whose shaft is connected by transmission means 81 to the rod or shaft 69. The transmission means 81 have, for example, a crank gear with cranks fixed to the shaft of the motor and to the polygonal section of the rod or shaft 69, and a connecting rod connecting these. The pivot drive apparatus 80 and/or the transmission means 81 are formed in such a way that, in the idle state, they together also form rotation-preventing means 85 for preventing the second closure flap 4 in certain intended swivel positions and in particular in the closed position from performing unintended rotations.

The second housing 2 differs from the first housing also in that it has a transition element 83 which is firmly connected, for example welded, to the hollow body 51 and the sleeve 57 and, above the second axis 8 of rotation, has a top surface which has, for example, a horizontal section adjacent to the end surface 51b at the highest point of the end surface 51b of the second hollow body 51 and a section inclined downward and away from said horizontal section.

The passage 63h of the second disc 63 is connected to the cavity of the seal 64 and is connected to a gas supply apparatus 88 by a gas line 87 which has a hose passing through the hollow bolt 70. The two gas supply apparatuses 48 and 88 have, for example, an air compressor and/or a compressed-air storage tank and valves for alternatively supplying compressed air to the cavities of the seals 24, 64 or venting the cavities of the seals.

The second flap 4 differs from the first flap 3 also in that the disc 63 of the second flap 4 has a hole 63i which leads from that section of the disc back surface 63e which is adjacent to the disc holder 71 into the indentation 63c of the disc 63. Also present is a gas line 89 with a hose which has an end which is tightly fixed in the hole 63i of the second disc 63, passes through the axial hole of the hollow bolt 70 and connects the indentation 63c to a suction apparatus 90. This has, for example, a vacuum pump and valves.

Figure 14:
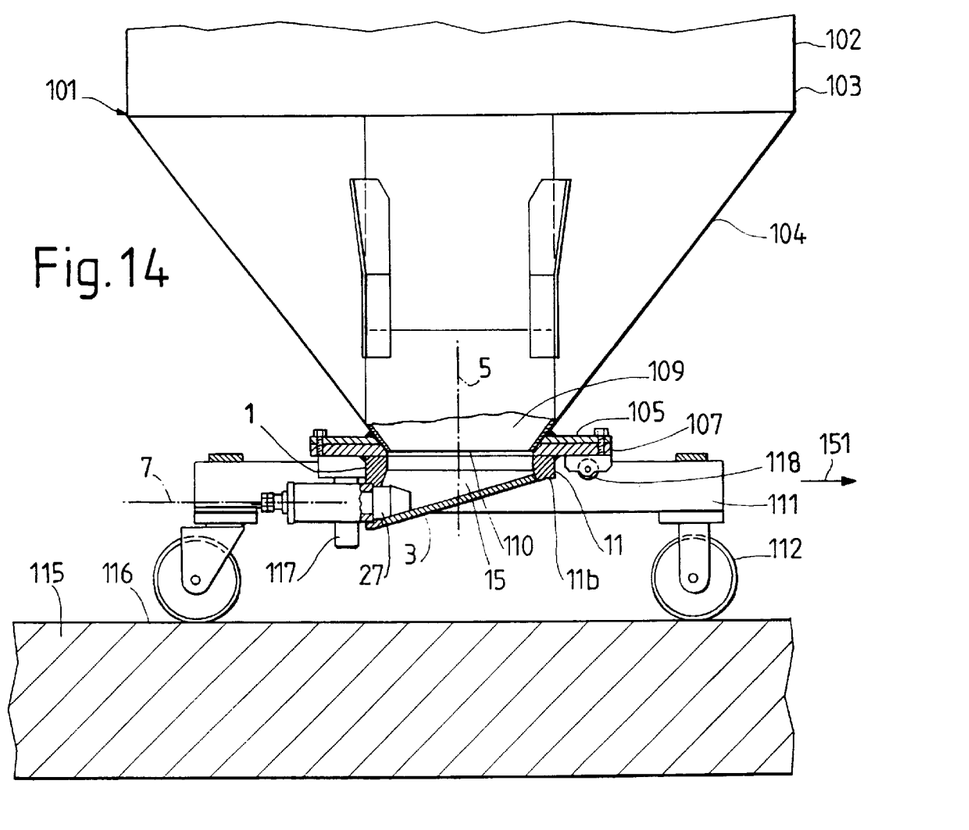
FIG. 14 shows a material-delivering apparatus, drawn partly as a view and partly as a vertical section, with a mobile container and the upper housing of the means, which housing is fastened to said container.
Figure 15:
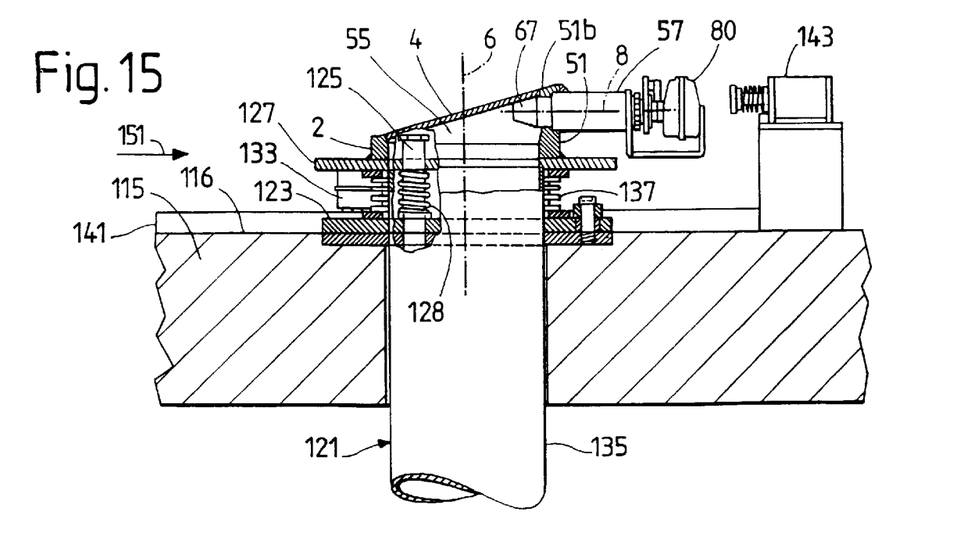
FIG. 15 shows a material-accepting apparatus, drawn partly as a view and partly as a vertical section, with the lower housing of the means.
Figure 16:
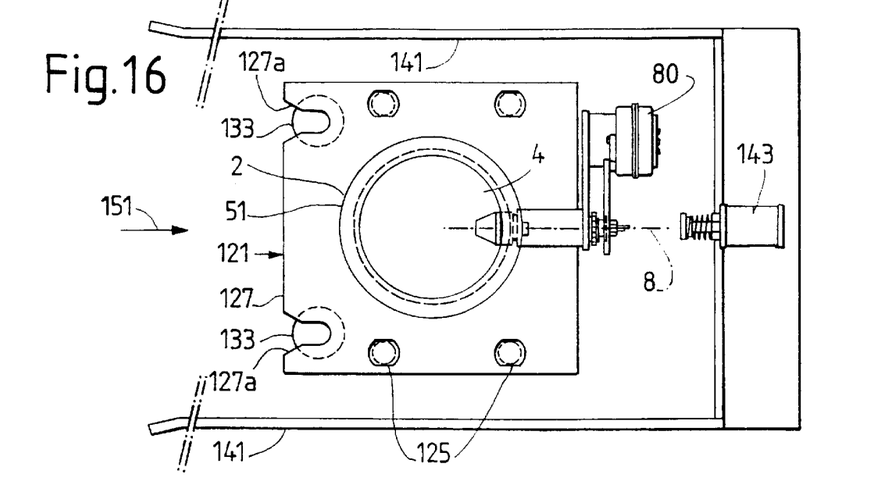
FIG. 16 shows a plan view of the material-accepting apparatus shown in FIG. 15 and the lower housing.
Figure 17:
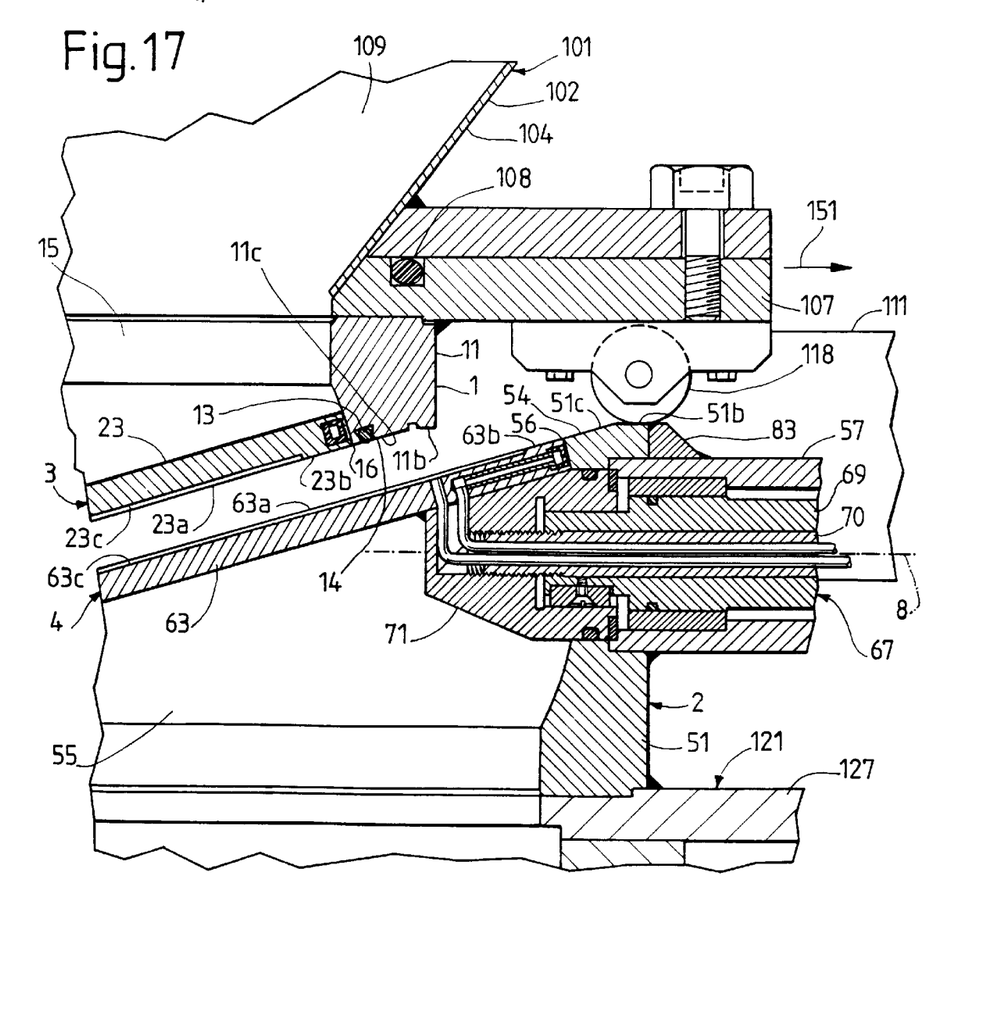
FIG. 17 shows a vertical section through parts of the material-delivering apparatus and the material-accepting apparatus on a larger scale than FIGS. 14 to 16, the two housings being approximately in the connected position.
Figure 18:
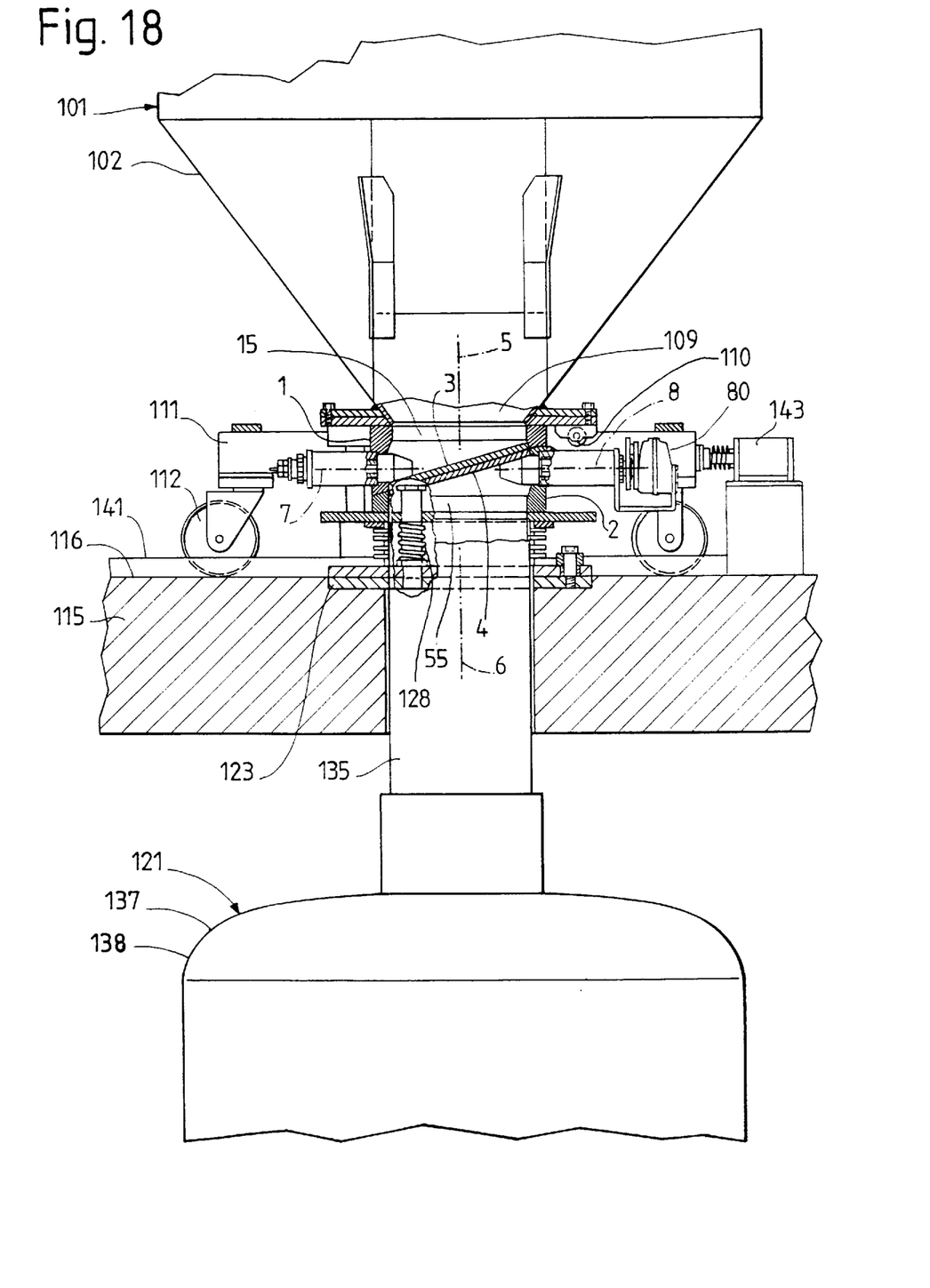
FIG. 18 shows a diagram of the material-delivering apparatus and of the material-accepting apparatus, drawn partly as a view and partly as a vertical section, the two housings being in the connected position.

The housing 1 and the closure flap 3 held by it can serve as parts of a material-delivering apparatus 101 shown in FIGS. 14, 17 and 18. Said apparatus has a transportable, first container 102 which serves for transporting a particulate material and possesses a wall 103 which has a conical wall part 104 tapering downward. An annular flange 105 is welded to said wall part. This annular flange is detachably connected, by means of screws, to an annular flange 107 which is adjacent to the end surface 11f of the hollow body 11 of the first housing 1 and is tightly fixed, for example welded, to the hollow body 11. The two annular flanges 105, 107 are sealed against one another by a seal 108 shown articularly clearly in FIG. 17. The container 101 has, for example, an axis which coincides with the first main axis 5 defined by the first housing 1. The wall 103 encloses a container inner space 109 which is connected, by an outlet orifice 110 present at the lowest point of the conical wall part 104, to the first cavity 15 enclosed by the first housing 1. The container 102 is detachably or nondetachably connected to a chassis 111 which has wheels 112. A floor 115 of a room of a manufacturing building or the like forms a support and running surface 116 on which the wheels 112 can stand and run. When the wheels are standing on a flat, horizontal section of the running surface 116, the first main axis 5 is vertical and the first axis 7 of rotation is horizontal. The wheels 112 are rotatable about axes of rotation which, at least in the container position shown in FIG. 14, are at right angles to a vertical plane running through the axes 5 and 7, so that the container is capable of travelling along this plane and thus parallel to the first axis 7 of rotation on the running surface 116. Two guide elements 117 which have, for example, pegs projecting vertically downward are fixed on the annular flange 107. Furthermore, a roller 118 is held on the annular flange 107, in the vicinity of the hollow body 11, in such a way that the lowest point of the roller 118 is located approximately at the height of the uppermost point of the end surface 11b of the hollow body 11. The roller 118 is rotatable about an axis of rotation which is at right angles to a vertical plane passing through the axes 5 and 7.

The second housing 2 and the closure flap 4 held by this may serve as parts of a material-accepting apparatus 121, which is shown partially in FIGS. 15, 16, 17 and 18. Said apparatus has a multi-part support 123 which is fixed to a point on the floor 115 and to which four vertical guide bolts 125 are fixed. These carry a bearing plate 127 which is pressed, by at least one spring and in fact four springs 128 each surrounding one of the bolts 125, upward against stops which are formed by heads of the guide bolts 125. The hollow body 51 of the second housing 2 is fixed on the bearing plate 127 in such a way that the second main axis 6 defined by the second housing is vertical and the second axis 8 of rotation is horizontal. The bearing plate has a hole which is tightly connected to the second cavity 55 enclosed by the second housing 2. The bearing plate has two guide recesses 127a for guiding the guide elements 117a of the material-delivering apparatus 101. The material-accepting apparatus has centring and locking means 133 which are arranged at the guide recesses 127a and held on the support 123 and/or the bearing plate. A vertically displaceable pipe 135 which projects vertically downward away from the bearing plate 127 and through a hole in the support 123 and through a hole in the floor 115 is fixed to said bearing plate. Furthermore, a bellows 137 enclosing a section of the pipe 135 is tightly fixed to the support 123 and to the bearing plate 127. The material-accepting apparatus 121 has, as a main component, an apparatus 137 which is indicated in FIG. 18 and arranged stationary in a room below the floor 115, serves for processing the material transportable with the container 102 and, for example, has a stationary, second container 138 which is tightly connected to the displaceable pipe 135. Two guide rails 141 which, in plan view, are parallel to the second axis 7 of rotation and serve as guide means for guiding the wheels 112 are fixed to the floor 115, at least in the vicinity of the support 123. A shock absorber 143 is also fixed to the floor 115.

The use and function of the connecting and closure means for transferring a flowable, particulate material which is contained in the transportable container 102 of the material-delivering apparatus 101 and is not shown, to the stationary container 138 of the material-accepting apparatus 121 will now be described.

The mobile container 102 is first arranged in such a way that the two housings 1 and 2 are in the disconnected positions, as in FIGS. 1, 2, 14 and 15, in which the housings are separated from one another. The flaps 3, 4 are then in the closed position shown in FIGS. 1, 2, 3, 7, 8 and 12 to 18. The planes defined by the contact surfaces 23b and 63b and the contact and end surface edges 23d and 63d, respectively, of two discs 23 and 63, respectively, coincide, in the closed position of the flaps, at least approximately and preferably exactly with the planes in which the annular surfaces 11c and 51c and the orifice edges 16a and 56a are present.

The hollow seals 24, 64 are shown in FIGS. 7, 8, 12 and 13 in the pressureless state. Narrow gaps are then preferably present between the inner surface sections 7h and 51h of the two hollow bodies 11 and 51, respectively, and the edges of the disc 23 or 63 and the hollow seals 24, 64. These gaps make it possible to swivel the flaps with little force and without subjecting the seals 24, 64 to wear. When the two flaps have been swivelled into the closed position during the use of the means, gas, namely compressed air, is fed to the cavities of the seals 24, 64 by the gas supply apparatuses 48 and 88, respectively. The hollow seals 24, 64 are thus inflated and deformed so that the seals 24, 64 seal the discs 23, 63 of the flaps 3 and 4, respectively, very close to the orifice edges 16a and 56a, respectively, against the inner surface sections 11h and 51h, respectively, of the housings and close the cavities 15 and 45 at the orifices 16 and 56, respectively. When the housings 1, 2 are separated from one another and the flaps 3, 4 are closed, the latter thus close the cavities 15, 55 of the housings 1 and 2, respectively, at the orifices 16 and 56, respectively, practically flush with the annular surfaces 11c and 51c, respectively, so that the inner surfaces 11g and 51g, respectively, of the two housings are practically completely sealed from the environment. Furthermore, only the end surface 23a or 63a of each flap 3, 4 comes into contact with the air surrounding the housings 1 and 2.

The material-delivering apparatus 101 with the first container 102 containing the particulate material is now moved to the material-accepting apparatus 121. During this procedure, the wheels 112 run on the running surface 116, of which at least that section which surrounds the support 123 and on which the wheels 112 are standing in the connected position shown in FIG. 18 is flat and horizontal. During the travel of the container 102, the wheels 112 are guided between the two rails 141 at least in that segment of travel or travel distance in which the two housings 1, 2 and their orifices 16 and 56, respectively, overlap one another in plan view. The container 102 is moved in the travel direction 151 indicated by an arrow and parallel to the two axes 7 and 8 of rotation, toward the intended connected position. In plan view, this travel direction 151 is directed from the first pivot 27 to the highest point of the first orifice edge 16a of the first housing 1, which point is furthest away from said pivot, and from the lowest point of the second orifice edge 56a of the second housing 2, which point is furthest away from the second pivot 67, to the second pivot 67. In plan view, the two housings 1, 2 accordingly overlap one another on approach first at their points furthest away from the sleeves 17 and 56 and pivots 27 and 67—i.e. at the highest point of the end surface 11b of the first housing 1 or the lowest point of the end surface 51b of the second housing 2.

At least in a part of the travel distance in which the two housings 1, 2 overlap in plan view, the roller 118 runs on the end surface 51b of the second housing 2, on the end surface 63a of the second flap 23 and finally on the top surface of the transition element 83. The second housing, the bearing plate 127 carrying this and the pipe 135 are displaced vertically and downward against the spring force generated by the springs 128.

When the first housing 1 is to a large extent present above the second housing 2, the peg-like guide elements 117 connected to the mobile container 102 engage the guide recesses 127a of the bearing plate 127 belonging to the material-accepting apparatus 121 and result in more precise fine guidance of the mobile container 102, in addition to the coarse guidance by the guide rails 141. Furthermore, the chassis 111 is adjacent to the shock absorber 143 and is braked. Centring and locking means 113 having movable parts then centre, align and position the two housings 1, 2 in such a way that the main axes 5, 6 coincide and the axes 7, 8 of rotation coincide in plan view. The chassis 111 or another part of the two apparatuses 101, 121 is formed, for example, in such a way that at least one of the two housings 1, 2 may move slightly and may also be able to perform limited swivelling movements about various axes during the positioning by the centring and locking means, not only in the direction of the guide rails 141 but also in a horizontal direction at right angles thereto. When, in the final segment of travel of the container 102, the roller 118 moves beyond the end surface 51b of the second housing 2, the springs 128 displace the bearing plate 127 and the second housing 2 supported by said plate upward toward the first housing 1, which is firmly held by the remaining parts of the material-delivering apparatus 101 which, owing to its weight, remains stationary on the running surface 116. The centring and locking means 133 then lock the material-delivering apparatus 101 and the material-accepting apparatus together.

During these processes, the two housings 1, 2 assume the connected position shown in FIGS. 7, 12, 13 and 18. In these, the abutting regions 14, 54 of the housings 1 and 2, respectively, abut one another, the seal 13 held by the first housing 1, and preferably also the annular surface 11c of the first housing 1, being adjacent to the annular surface 51c of the second housing 2. The flat, first and second connecting surfaces defined by the annular surfaces 11c, 51 and orifice edges 16a, 56a, and mouth areas, then coincide at least approximately and in the ideal case completely. Furthermore, the main axis 5 coincides with the main axis 6, and the axis 7 of rotation coincides with the axis 8 of rotation. In addition, the contact surfaces 23b and 63b belonging to the end surfaces 23a and 63a, respectively, of the discs 23, 63 of the two flaps 3 and 4, respectively, rest against one another up to the contact and end surface edges 23d and 63d, respectively. If in addition the flaps are in the closed position according to FIG. 18, their contact surfaces 23b, 63b are at least approximately and in the ideal case completely in the flat mouth areas and connecting surfaces.

In the connected position, the two indentations 23c, 63c of the two discs 23, 63, together form a cavity which is sealed more or less tightly from the cavities 15 and 55 by the smooth contact surfaces 23b, 63b adjacent to one another. If necessary, air may be sucked by means of the suction apparatus 90 out of the cavity formed by the indentations 23c and 63c and said cavities may be evacuated so that the air pressure in this cavity is lower than in the cavities 15, 55 and in the vicinity of the housings 1, 2. The two discs 23, 63 are then additionally pressed against one another by the pressure of the air present in the cavities 15, 55 and are thus firmly connected to one another, in particular during swivelling, so that together they form virtually one disc and stiffen one another.

If the flaps 3, 4 are to be swivelled, the cavities of the seals 24, 64 can be vented with the aid of valves of the gas supply apparatuses 48 and 88. Furthermore, a person may manually press the pressure pin 43 from its position shown in FIGS. 7 and 11 temporarily inward and may push the locking element 41, against the force of the spring 42, out of the hole 17b toward the first axis of rotation until the adjacent ends of the locking element 41 and of the pressure pin 43 are present in the annular space between the inner surface of the sleeves 17 and the outer surface of the hollow rod or shaft 29. The two flaps 3, 4 can then be swivelled together, with the aid of the pivot drive apparatus 80, through about 90° into the open position shown in FIGS. 4 and 5. When the stated person releases the pressure pin 43, which no longer engages the locking element 41, said pressure pin is moved by the gravitational force back into the position shown in FIGS. 7 and 11.

In the connected position of the two housings 1, 2, the cavities 15 and 55 of said housings together form a passage which has a vertical axis and through which the material transported in the container 102 can fall into the container 138 when flaps 3, 4 are in the open position. Since the discs 23, 63 of the two flaps are adjacent to one another, the material cannot come into contact with the end surfaces 23a and 63a of the two discs.

When the material has been transferred from the container 102 of the material-delivering apparatus 101 to the container 138 of the material-accepting apparatus 121, the two flaps 3, 4 can be swivelled together by means of the pivot drive apparatus 80 back into the closed position. When the first flap 3 reaches the closed position, the locking element 41 snaps into the radial hole 17b of the sleeve 17 under the action of the spring 42. The cavity formed by the indentations 23c, 63c can then be aerated with the aid of a valve connected to the gas line 89. Starting from its position shown in FIG. 18, the container 102 can then be moved on the running surface 116 in a direction opposite to the travel direction 151 of the material-accepting apparatus, the two housings 1, 2 being separated from one another and achieving disconnected positions.

Since the transferred material never comes into contact with the end surfaces 23a, 63a of the discs 23 and 63, respectively, and since these close the cavities 15 and 55, respectively, in the closed position practically up to the orifice edges 16a and 56a, respectively, practically no material which may be adhering to the inner surfaces 11g, 51g or to the flaps can enter the vicinity of the housings after the transfer of material. Conversely, in the closed position no contaminating material from the environment can enter the cavities 15, 55 of the housings and the transferred material.

The pivots 27 and 67 are supported in a satisfactory and stable manner, by the various bearings completely surrounding the axes of rotation and those sections of the pivots which are rotationally symmetrical with said axes, both when housings 1, 2 are connected to one another and when said housings are separated from one another and in all swivel positions of the flaps. Furthermore, the pivots 27, 67 are satisfactorily sealed from the housings by the annular seals 33, 34 completely surrounding the first axis 7 of rotation and those sections of the first pivot 27 which are rotationally symmetrical with said axis, and by the corresponding seals surrounding the second axis 8 of rotation and the second pivot 67, both when housings 1, 2 are connected to one another and when said housings are separated from one another and in all swivel positions of the flaps.

The good support and sealing of the pivots in combination with the arrangement of the discs of the flaps 3, 4 ensure that the transported material does not contaminate the vicinity of the means and that furthermore no contaminating materials from the environment enter the cavities 15, 55 of the housings, so that the material, too, is not contaminated.

Figures 1, 2:
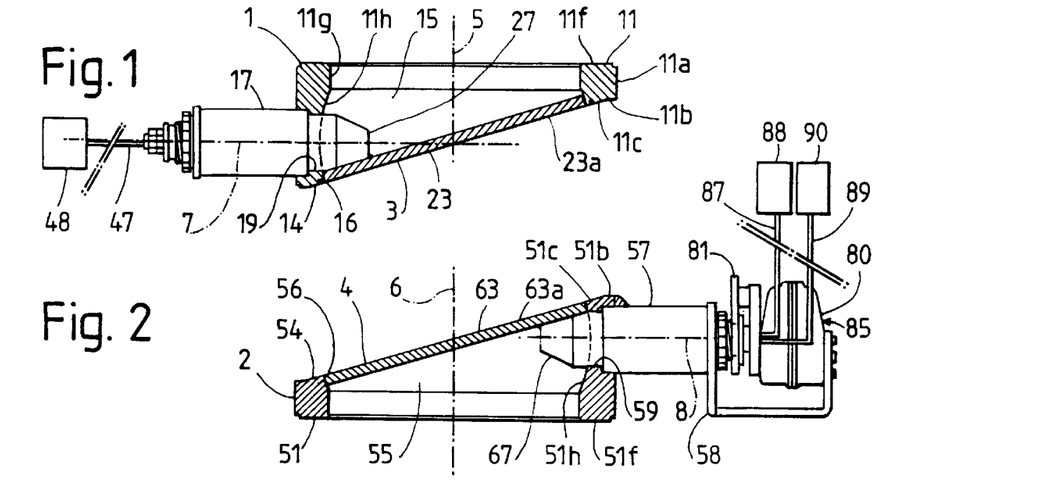
FIG. 1 shows a schematic, simplified vertical section through the hollow body of the upper housing and the flap of a means for transferring a flowable material, which flap is held by said housing and is in the closed position.
FIG. 2 shows a diagram, analogous to FIG. 1, of the lower housing and the flap of the means, which flap is held by said housing.
Figure 3:
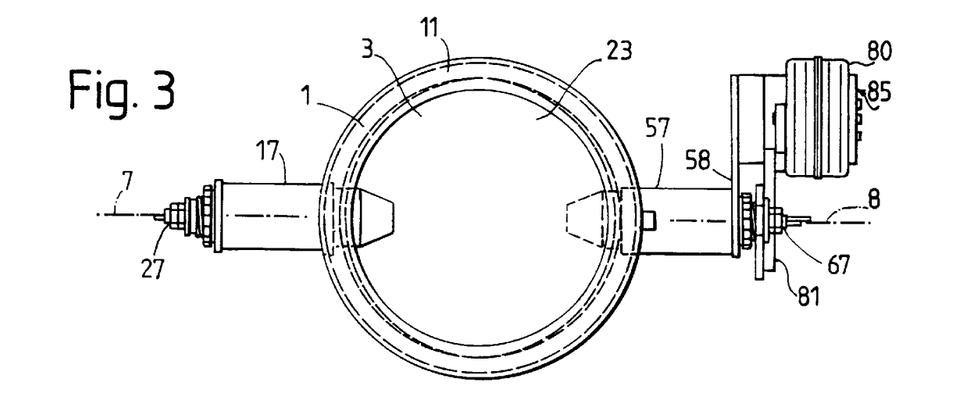
FIG. 3 shows a plan view from above onto the two housings connected to one another, with the flap in the closed position.
Figure 4:
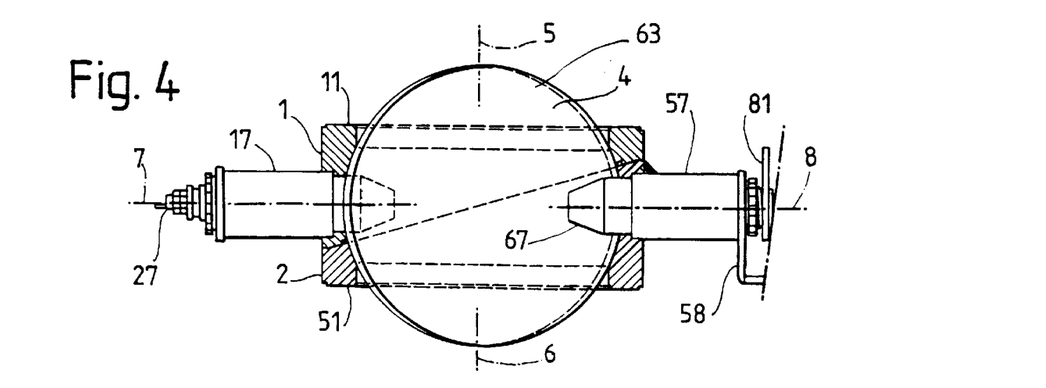
FIG. 4 shows a vertical section through the two housings connected to one another, with the flap in an open position.
Figure 5:
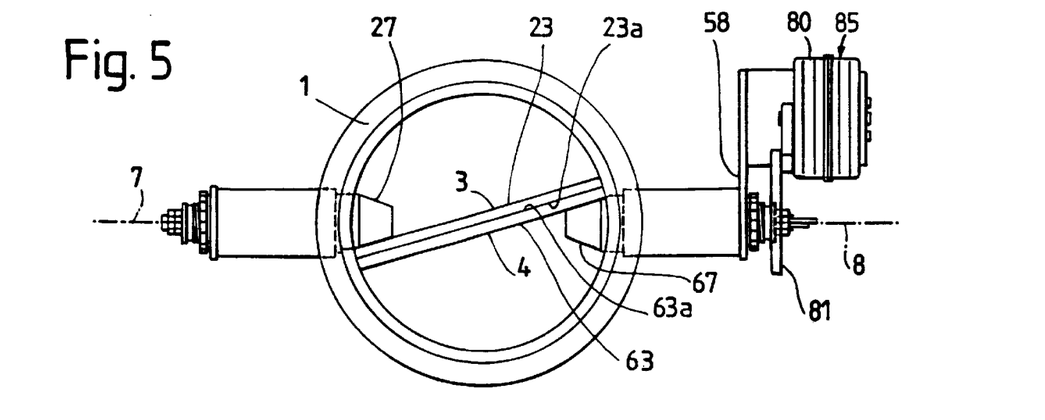
FIG. 5 shows a plan view, analogous to FIG. 3, onto the housing but with flaps in the open position.
Figure 6:
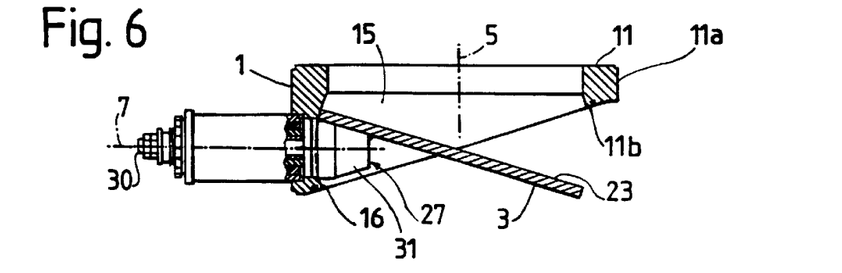
FIG. 6 shows a vertical section through the upper housing and the flap held by said housing and swivelled through 180° relative to the closed position.

When the two housings are separated from one another, when the flaps are in the closed position and when, for example, the first housing 1 and the first flap 3 are to be cleaned, the locking element 41 can be pressed in an inward direction out of the hole 17b, the polygonal section 29c of the hollow rod or shaft 29 can be held by means of a wrench or other tool and the flap can be swivelled through about 180° into the removal/assembly position shown in FIG. 6. The two nuts 38 can then be unscrewed from the bolt 30 from the region of the housing 1, and the disc 23, the disc holder 31, the bolt 30 and the hose of the line 47 in FIG. 6 can be moved to the right and removed from the hollow body 11 through the orifice 16. Those surfaces of the housing 1 and of the flap 3 which come into contact with the transferred material can now be thoroughly cleaned. The removed parts of the flap 3 can then be introduced into the housing 1 again and can be fixed by means of the nuts 38.

For cleaning the second housing 2 and the second flap 4, the latter can be swivelled into a removal/assembly position with the aid of the pivot drive apparatus 80 or of a tool, said position corresponding to the position of flap 3 shown in FIG. 6, and the disc 63 of the second flap 4 can then be temporarily removed.

The means can be modified in various respects.

For example, the housings 1, 2 can also be provided, at the end surfaces, with flanges which can be detachably connected to one another by screws or other connecting means. Furthermore, the shapes of the housings 1, 2 and the containers and/or other parts of the material-delivering and material-accepting apparatuses which are connected to said housings may be modified in various ways.

Moreover, those end surfaces of the two discs which are adjacent to one another when the housings are in the connected positions may be sealed against one another by means of a seal arranged as close as possible to the end surfaces edges. However, it is also possible to omit the gas line 89 and the suction apparatus 90 and to dispense with evacuation of the cavity formed in the connected position by the indentations 23c, 63c of the discs.

Furthermore, the hollow inflatable seals 24, 64 arranged on the discs 23, 63 can be replaced by non-inflatable seals or can be omitted and instead inflatable or non-inflatable seals can be fixed on the housings 1 and 2, by means of which seals the discs of the flaps can be sealed from the housings in the closed position. These seals are then arranged in such a way that they seal the housings and discs of the flaps as close as possible to, or directly at, the orifice edges of the housings and the end surface edges of the discs of the flaps. The edge surfaces of the discs may then likewise form parts of spherical surfaces.

The bearing means and sealing means for pivotable bearing and sealing of the pivots and the latter themselves can of course also be varied. The pivots can be supported, for example, by means of roller bearings and the number and arrangement of the seals can then be appropriately adapted. Each pivot may be supported only by a single bearing and/or may be sealed from a section of the housing and/or a bearing holding said housing by only a single seal surrounding said pivot.

Instead of having a motor, the pivot drive apparatus 90 may have a manually rotatable crank or the like or a cylinder with a pneumatically or hydraulically adjustable piston. If necessary, rotation-preventing means formed analogously to the rotation-preventing means 45 may also be provided for preventing the second flap from swivelling. Of course, a swivel drive apparatus for swivelling the flap mounted in the upper housing may be provided instead of the swivel drive apparatus 90 used for swivelling the flap 4.

The circular discs 23, 63 may furthermore be replaced by discs which, in plan view onto their end surfaces, have a polygonal or oval contour. The shapes of the orifices 16, 56 and of the inner surface sections 11h, 51h would then have to be adapted, the inner surface sections corresponding to the latter preferably being arc-shaped in cross-sections at right angles to the axes of rotation.

Furthermore, a connecting and locking means according to the invention can be provided with a housing which is arranged at the top of a mobile container and has an orifice which is open at the top and can be closed by means of a flap and through which a flowable material can be passed into the container.

As described, in the embodiment shown for the means according to the invention, the annular surface 11c, 51c of each housing 1 and 2 lies in a flat connecting surface which coincides with the flat mouth area enclosed and defined by the orifice edge 16a or 56a and which is inclined relative to the axis 7 or 8 of rotation. However, the connecting surfaces and mouth areas may deviate slightly from a plane. The mouth area of each housing can then form the smallest possible surface which is encompassed by the orifice edge and contiguous with the orifice edge of concerned housing. The mouth areas and connecting surfaces may then be for example, at least in parts, curved and/or angled in a section passing through the main axes 5, 6 and axes 7, 8 of rotation and straight in cross-sections which are perpendicular to the axes of rotation. The contact surface of the flap present in the relevant housing could then likewise be in the relevant non-flat connecting surface when the flap is in the closed position.

What is claimed is:

1. Apparatus for transferring material, said apparatus including two housings, each housing having an orifice and holding a flap that is pivotable about an axis of rotation, said housings separatable and connectable from one another such that when in a connected position, said housings abut one another in abutting regions surrounding the orifices, each flap connected with a pivot that is rotatably mounted in the housing holding the flap such that the flap can be swivelled between a closed position in which the flap closes the housing orifice and an open position in which the flap at least partly opens the housing orifice, the flaps being adjacent to one another and each axis of rotation of each said flap coinciding when the housings are in the connected position, wherein each housing has an orifice edge surrounding said orifice, said orifice edge surrounding and defining a mouth area of said orifice, wherein each axis of rotation intersects said mouth area at an acute angle such that each axis of rotation passes into the housing at said pivot and emerges from the housing through the orifice, each flap including a hollow seal that is inflatable to tightly engage the housing and to seal the flap to said housing when said flap is in a closed position.

2. Apparatus as claimed in claim 1, wherein each housing includes a wall having an inner surface section which borders the orifice and which forms arcs which are coaxial with the axis of rotation in cross-sections at right angles to the axis of rotation defined by the housing.

3. Apparatus as claimed in claim 1, wherein each flap includes a disc which is circular in plan view and wherein each housing forms a part of a spherical surface, the center of which lies on an axis of rotation.

4. Apparatus as claimed in claim 1, wherein each flap is connected with each said pivot exclusively on one side of said flap, said flap comprising a closure member rigidly connected to said pivot for closing the orifice of the housing in the closed position.

5. Apparatus as claimed in claim 4, wherein each pivot has a shaft rotatably mounted in the housing, each closure member detachably connected to the shaft by fixing means, whereby the closure member can be separated from the shaft when the fixing means is released to enable removal of said closure member from the housing through the orifice.

6. Apparatus as claimed in claim 1, wherein each housing has a hole which completely surrounds the axis of rotation in cross-section at right angles to the axis of rotation, said hole containing at least a part of said pivot.

7. Apparatus as claimed in claim 6, wherein said hole of each housing and said part of said pivot in said hole are at least partly rotationally symmetrical with respect to the axis of rotation.

8. Apparatus as claimed in claim 7, wherein at least one rotationally symmetrical section of said pivot is sealed by at least one seal, surrounding the pivot, from a section of the housing which surrounds said pivot.

9. Apparatus as claimed in claim 1, wherein each pivot is rotatably mounted in at least one section of a hole in each said housing, which section surrounds said pivot in cross-section.

10. Apparatus as claimed in claim 9, wherein each housing includes a one-piece hollow body bounding its orifice and a sleeve rigidly connected to said hollow body and forming at least a part of said hole of the relevant housing said sleeve including at least one bearing for supporting said pivot.

11. Apparatus as claimed in claim 1, further comprising rotation-preventing means interacting with the pivots for securing each of the two flaps in the closed position and preventing each of said two flaps from swivelling.

12. Apparatus as claimed in claim 11, wherein said rotation-preventing means includes a spring-loaded locking element which locks in the closed position of one flap and connects the pivot of such flap in the locked state in a nonpivotable manner to the housing holding such flap, and wherein the pivot of the other flap is connected to a pivot drive apparatus which, in a non-driven state, prevents rotation and can be operated one of electrically, pneumatically and hydraulically.

13. Apparatus as claimed in claim 1, wherein said hollow seal can be connected to a gas supply through the pivot connected to said flap.

14. Apparatus as claimed in claim 1, wherein, when the housings are in the connected position, said flaps together bound a cavity connectable to a suction apparatus through the pivot of one of said flaps.

15. Apparatus as claimed in claim 1, wherein said acute angle is at least 5° and at most 45°.

16. Apparatus as claimed in claim 1, wherein said mouth area is flat.

17. Apparatus as claimed in claim 16, wherein each of said abutting regions has a flat annular surface which borders the orifice edge and lies in the same plane as the mouth area.

18. Apparatus as claimed in claim 1, wherein a first of said two housings is fixed to a container surrounding a container inner space and bounds a cavity connecting said first housing orifice to the container inner space, wherein the first housing and the container are connected to a chassis which can be driven on a flat running surface, and wherein the mouth areas of the two housings, in the connected position of the two housings, are inclined relative to the running surface in a section passing through the axes of rotation and at right angles to the running surface.

19. Apparatus as claimed in claim 18, further comprising guide means for guiding the first housing, when said first housing is driven by said chassis toward the connected position, at least in a travel segment in which the orifices overlap in a viewing direction at right angles to the running surface, in a direction which, in the viewing direction, is parallel to the axis of rotation defined by the second of said two housings.

20. Apparatus as claimed in claim 18, wherein the second of said two housings is held on a support in an at least approximately vertically displaceable manner and further comprising at least one spring for exerting on the second housing, in the connected position of the housings, a spring force directed toward the first housing.

21. Apparatus as claimed in claim 20, wherein a roller is rotatably mounted on the first housing such that, during travel of said first housing to the connected position, said roller runs on at least one of the second housing and of the flap held by said second housing and presses the second housing temporarily away from the first housing against the spring force.

22. Apparatus as claimed in claim 1, wherein each flap includes a disc with a disc edge provided with an annular groove holding said hollow seal.

23. Apparatus as claimed in claim 13, wherein each flap includes a disc having a front surface and a back surface, wherein the flaps contact one another at the front surfaces of the discs when the two housings are in the connected position, wherein each pivot has a surface resting against the back surface of the disc to which it is connected and wherein each hollow seal is connected to the gas supply through a gas line which has a portion running from the hollow seal through the disc, passing through the back surface of the disc, into a hole of the pivot, and through the pivot out of the housing.

24. Apparatus as claimed in claim 1, wherein each hollow seal has a cavity connected to a gas supply apparatus comprising valve means for alternatively supplying and venting gas to and from said cavity.

25. Apparatus for transferring material, said apparatus including two housings, each housing having an orifice and holding a flap that is pivotable about an axis of rotation, said orifice bounded by an orifice edge which defines and surrounds a flat mouth area, said housings separatable and connectable from one another such that when in a connected position, said housings abut one another in abutting regions surrounding the orifices, each flap connected on one side of the flap with a pivot mounted in the housing holding the flap such that each flap can be swivelled between a closed position in which the flap closes the orifice of the housing holding the flap and an open position in which the flap at least partly opens the orifice of the housing holding the flap, the flaps being adjacent to one another and each axis of rotation of each said flap coinciding when the housings are in the connected position, each mouth area inclined relative to the axis of rotation of the flap within such mouth area, drive means connected to one of the pivots for pivoting said pivot and the flap connected thereto, said drive means securing said pivot against pivoting when said drive means is in a rest state, pivot prevention means comprising a movable spring loaded locking element for locking the pivot that is not connected with said drive means relative to the housing in which the pivot is mounted for preventing said pivot and the flap connected thereto from pivoting when the flap is in a closed position and the housings are separated from one another.

26. Apparatus as claimed in claim 25, wherein each flap has a front surface and contacts the other flap at this front surface when the two housings are in the connected position, wherein said front surface of each flap defines a plane and wherein the pivots and flaps can be swivelled by an angle of 90° from the closed position into an open position in which the planes defined by the front surface of the flaps are perpendicular to the mouth areas of the housings.

27. Apparatus as claimed in claim 25, wherein the drive means is operable one of electrically, pneumatically and hydraulically.

28. Apparatus as claimed in claim 25, wherein the housings bound cavities forming in the connected state of the housings a material passage for the material to be transferred, wherein the material passage has an axis, wherein the axes of rotation are perpendicular to the axis of the material passage and wherein the mouth area is a flat surface forming an angle different from 90° with the axis of the material passage.

29. Apparatus as claimed in claim 27, wherein each flap, in the closed position, can be sealed from the housing holding the relevant flap, by a hollow seal which can be extended by inflating.

30. Apparatus for transferring material, said apparatus including two housings, each housing having an orifice and holding a flap that is pivotable about an axis of rotation, said orifice bounded by an orifice edge which defines and surrounds a mouth area, said two housings separatable and connectable from one another such that when in a connected position, said housings abut one another in abutting regions surrounding the orifices, each flap connected on one side of the flap with a pivot mounted in the housing holding the flap such that each flap can be swivelled between a closed position in which the flap closes the orifice of the housing holding the flap and an open position in which the flap at least partly opens the orifice of the housing holding the flap, the flaps being adjacent to one another and each axis of rotation coinciding when the housings are in the connected position, each mouth area inclined relative to the axis of rotation of the flap within such mouth area, wherein a first of said two housings is fixed to a container surrounding a container inner space and bounds a cavity connecting said first housing orifice to the container inner space, wherein the first housing and the container are connected to a chassis having wheels so that it can be driven on a flat running surface, and wherein the mouth areas of the two housings, in the connected position of the two housings, are inclined relative to the running surface in a section passing through the axes of rotation and at right angles to the running surface.

31. Apparatus as claimed in claim 30, further comprising guide means for guiding the first housing, when said first housing is driven together with the chassis toward the connected position, at least in a travel segment in which the orifices overlap in a viewing direction at right angles to the running surface, in a direction which, in the viewing direction, is parallel to the axis of rotation defined by the second of the two housings.

32. Apparatus as claimed in claim 30, wherein the second of the two housings is held on a support in an at least approximately vertically displaceable manner and further comprising at least one spring for exerting on the second housing, in the connected position of the housings, a spring force directed toward the first housing.

33. Apparatus claimed in claim 32, wherein a roller is rotatably mounted on the first housing such that, during travel of said first housing to the connected position, said roller runs on at least one of the second housing and of the flap held by said second housing and presses the second housing temporarily away from the first housing against the spring force.

34. Apparatus for transferring material, said apparatus including two housings, each housing having an orifice and holding a flap that is pivotable about an axis of rotation, said housings separatable and connectable from one another such that when in a connected position, said housings abut one another in abutting regions surrounding the orifices, each flap connected with a pivot that is rotatably mounted in the housing holding the flap such that the flap can be swivelled between a closed position in which the flap closes the housing orifice and an open position in which the flap at least partly opens the housing orifice, the flaps being adjacent to one another and each axis of rotation of each said flap coinciding when the housings are in the connected position, wherein each housing orifice defines a substantially planar mouth area wherein each axis of rotation is inclined with respect to the mouth area, and wherein each flap includes a hollow seal that is inflatable to tightly engage the housing and to seal the flap to said housing when said flap is in a closed position.

* * * * *